United States Patent Office 3,334,107
Patented Aug. 1, 1967

3,334,107
1,2-ALKYLENE-IMIDAZOLINONES-(5)
Rudolf G. Griot, Florham Park, N.J., assignor to
Sandoz Inc., Hanover, N.J.
No Drawing. Filed Mar. 13, 1964, Ser. No. 351,858
21 Claims. (Cl. 260—294.7)

ABSTRACT OF THE DISCLOSURE

The present invention relates to compounds which may be used as intermediates for the preparation of oxo-penta-methylene-imidazolidines according to procedures fully described in pending application Ser. No. 349,487 filed Mar. 4, 1964, of which the instant application is a continuation-in-part. Said compounds possess a low level of toxicity and demonstrate a reversible type of Monoamine Oxidase inhibition. In the field of psychiatric medicine these compounds (including the pharmaceutically acceptable acid addition salts thereof) are thus useful as psychic energizers. Administration can either be oral or parenteral. The low toxicity permits dosages up to 280 milligrams per day.

This invention concerns, more specifically, 4-substituted-1,2-alkylene-imidazolinones-(5), acid addition salts thereof, intermediates therefor, and methods of preparing same. The structure of these compounds is reflected by one of the formulae (I) and (II)

wherein each of $$-\underset{R^2}{\overset{R^1}{\underset{|}{C}}}-$$

and $$-\underset{C_{s-1}H_{2s-1}}{\overset{C_{m-1}H_{2m-1}}{\underset{|}{C}}}-$$

is the residue of a primary α-amino acid $$H_2N-\underset{R^2}{\overset{R^1}{\underset{|}{C}}}-COOH$$

and $$H_2N-\underset{C_{s-1}H_{2s-1}}{\overset{C_{m-1}H_{2m-1}}{\underset{|}{C}}}-COOH$$

respectively;
$R^1$ is either hydroxy(lower)alkyl, e.g. 2-hydroxyethyl; (lower)alkyl-thio-(lower)alkyl, e.g. methyl thioethyl; amino carbonylamino(lower)alkyl, e.g. amino carbonyl-aminopropyl; phenyl(lower)alkyl, e.g. benzyl; substituted benzyl wherein the substituents comprise hydroxy (—OH), bromine (—Br) and iodine (—I) and are directly bound to a ring carbon atom, e.g. 3,4-dihydroxybenzyl; indolyl(lower)alkyl, e.g. 4(or 5)-imidazolemethyl; phenyl; guanido(lower)alkyl, e.g. guanidopropyl; or guanidoxy(lower)alkyl, e.g. guanidoxyethyl;

$R^2$ is either hydrogen (—H) or lower alkyl, e.g. alkyl with from 1 to 5 carbon atoms, such as methyl, isopropyl, and butyl;
alternatively
$R^1$ and $R^2$ are, taken together, either a saturated, e.g. pentamethylene, or an ethylenically unsaturated, e.g. pentadienyl-1,3-, hydrocarbon chain of from two to eight carbon atoms;
$R^3$ is either hydrogen (—H) or lower alkyl, e.g. methyl, isopropyl and butyl;
$n$ is either 2 or 3; and
each of $m$, $p$ and $s$ is an integer from 1 to 6, inclusive, the sum of $m$, $p$ and $s$ being at least 4.

These compounds are prepared [by the methods described in "Justus Liebigs Annalen Der Chemie," 623 (1959), pages 166 to 176 and described in Patent 3,002,- 000] from known starting materials or compounds which are prepared according to well-known procedures. An α-amino acid is first reacted with a caprolactim or valero-actim methyl (or ethyl) ether according to the reaction scheme:

(A)

$$H_2N-R-COOH + HC\underset{R^3}{\overset{N=C}{\underset{|}{\overset{O-CH_3}{\underset{|}{\underset{(CH_2)_n-CH_2}{}}}}}} \longrightarrow \underset{R^3}{\overset{O=C-R}{\underset{|}{\underset{HN-C}{\overset{HO}{\underset{|}{\underset{HC-(CH_2)_n-CH_2}{}}}}}}}$$

(III)     (IV)     (V)

wherein

R is either $-\underset{R^2}{\overset{R^1}{\underset{|}{C}}}-$ or $-\underset{C_{s-1}H_{2s-1}}{\overset{C_{m-1}H_{2m-1}}{\underset{|}{C}}}-$ and each of $R^1$, $R^2$, $R^3$, $m$, $n$ and $s$ has the same meaning as defined heretofore.
Ring closure is then effected by dehydration:

(B)

$$(V) \xrightarrow{-H_2O} \underset{R^3}{\overset{O=C-R}{\underset{|}{\underset{HC-(CH_2)_n-CH_2}{\overset{N}{\underset{||}{\underset{N-C}{}}}}}}}$$

to produce compounds (I) and (II).

The only prerequisites of the α-amino acid (III) are (a) that it be an α-amino acid, (b) that the α-amino group be a primary amino group and (c) that said acid contain only one primary amino group. Compound (III) is thus any primary α-amino acid having only one primary amino group.

The following Table A reflects some of the contemplated primary α-amino acids and the corresponding definitions of $R^1$ and $R^2$.

TABLE A

| Name | Formula | R¹ | R² |
|---|---|---|---|
| 1. Glycine | $CH_2(NH_2)COOH$ | H | H |
| 2. α-Alanine | $CH_3CH(NH_2)COOH$ | $CH_3$ | H |
| 3. Serine | $HOCH_2CH(NH_2)COOH$ | $HOCH_2$ | H |
| 4. Threonine | $CH_3CH(OH)CH(NH_2)COOH$ | $CH_3CH(OH)$ | H |
| 5. Valine | $(CH_3)_2CHCH(NH_2)COOH$ | $(CH_3)_2CH$ | H |
| 6. Methionine | $CH_3S(CH_2)_2CH(NH_2)COOH$ | $CH_3S(CH_2)_2$ | H |
| 7. Phenylalanine | ⌬—$CH_2CH(NH_2)COOH$ | ⌬—$CH_2$ | H |
| 8. Dibromotyrosine | $HO$—⌬(Br,Br)—$CH_2CH(NH_2)COOH$ | $HO$—⌬(Br,Br)—$CH_2$ | H |
| 9. Tryptophane | (indole)—$CH_2CH(NH_2)COOH$ | (indole)—$CH_2$ | H |
| 10. Histidine | (imidazole)—$CH_2CH(NH_2)COOH$ | (imidazole)—$CH_2$ | H |
| 11. α-Amino isobutyric acid | $H_2NC(CH_3)_2COOH$ | $CH_3$ | $CH_3$ |
| 12. α-Phenyl glycine | ⌬—$CH(NH_2)COOH$ | ⌬— | H |
| 13. α-Amino-cyclohexane carboxylic acid | ⌬(NH₂)(COOH) | —$CH_2CH_2CH_2CH_2CH_2$— | |
| 14. α-Methyl-α-phenyl glycine | $H_2NC(CH_3)COOH$, ⌬ | ⌬— | $CH_3$ |

All acid addition salts, e.g. hydrochlorides, maleinates, oxalates, methane sulfonates, tartrates, citrates and salicylates, of Compounds I and II are contemplated. They are useful as intermediates for preparing the corresponding free base. The pharmaceutically acceptable acid addition salts are useful in the same manner and for the same purpose as the free base.

The following examples illustrate the invention, the parts and percentages being by weight unless otherwise stated, and the relationship of parts by weight to parts by volume being the same as that of the kilogram to the liter. All temperatures are in degrees centigrade.

EXAMPLE 1

*Methanol adduct of N-(6-methylazacyclohexan-2-yliden)imino-α-methylacetic acid*

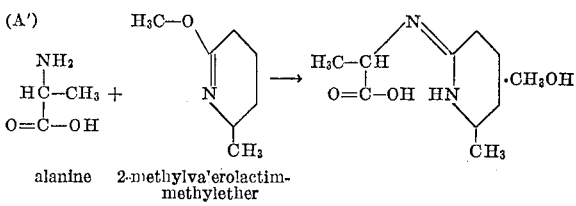

alanine    2-methylvalerolactim-methylether

Suspend 13.35 parts of alanine (0.15 mole) in 70 parts of methanol and stir vigorously. To the resulting suspension add (in one portion) 28.8 parts (0.225 mole) of a 2-methylvalerolactimmethylether [Hildebrand, J. G., et al., "J.A.C.S.," 58, 650 and 651, 1936], and stir the product at room temperature (about 20°) overnight 17 to 20 hours). Reaction A' takes place.

Add 70 parts by volume of diethylether to the resultant admixture, and filter the crystalline reaction product produced. Dry said crystalline reaction product at 60°/12 millimeters (mm.) Hg for from two to four hours to obtain crude title compound as an adduct with one molecule of methanol (a crystal of solvation).

EXAMPLE 2

*2,8-dimethyl-1,7-diaza-bicyclo(4,3,0)-nonen-Δ⁶,⁷-one-(9)*

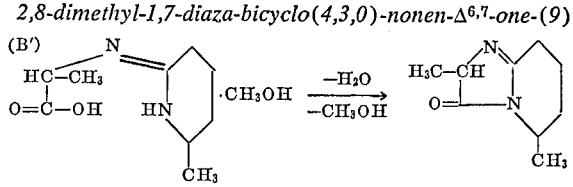

Place 28.6 parts (0.133 mole) of the methanol adduct (prepared according to Example 1) in a round bottomed flask connected to a water separator. Add thereto a mixture of 200 parts by volume of toluene and 20 parts by volume (containing 0.100 part of paratoluenesulfonic acid) of dimethylformanide (DMF). Heat the resulting admixture to reflux.

Remove the first 50 parts by volume of refluxing solvent which contains the adducted methanol of the starting material. Reflux the remainder for about two hours (until no more water is split off and the boiling material is fully dissolved). Remove the solvents by distillation from a water bath in vacuo ($10^{-3}$ mm. Hg). Distill the remaining oil from an oil bath in vacuo ($10^{-3}$ mm. Hg). The oil product (title compound) is viscous and solidifies at room temperature.

EXAMPLE 3

*Hydrochloride of 2,8-dimethyl-1,7-diaza-bicyclo(4,3,0)-nonen-Δ⁶,⁷-one-(9)*

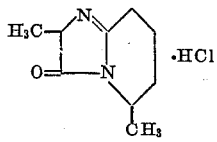

Dissolve the oil product of Example 2 in equal parts of isopropanol. To the resulting solution add sufficient 20 percent hydrogen chloride (in isopropanol) to neutralize said oil product. Precipitate the title hydrochloride by cooling the neutralized material to 0°. Filter the precipitate from its mother liquor. Add dry diethylether to the mother liquor filtrate until the resulting solution turns turbid. A further amount of crystals of the title hydrochloride is thus obtained. The total yield is from 80 to 90 percent by weight based upon the starting weight of the oil product of Example 2.

EXAMPLE 4

*Maleinate of 2,8-dimethyl-1,7-diaza-bicyclo(4,3,0)-nonen-Δ⁶,⁷-one-(9)*

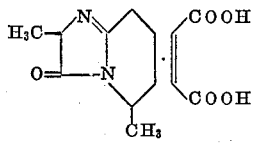

Dissolve equivalent amounts of maleic acid and the oil product of Example 2 in absolute (ethyl)alcohol. Add diethyl ether to the resultant solution. The maleinate formed precipitates overnight. Recrystallize from methanol.

In similar manner every acid addition salt is prepared from any Compound I or Compound II.

EXAMPLE 5

*2,8-dimethyl-1,7-diaza-bicyclo(4,3,0)-nonen-Δ⁶,⁷-one-(9)*

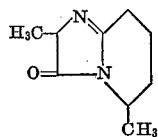

Dissolve 4.25 parts (0.021 mole) of the title compound of Example 3 in 20 parts by volume of water. Add thereto 10 parts of potassium carbonate. Extract the resulting solution with chloroform in a continuous extraction apparatus (Kutscher-Steudel type) until the aqueous phase is exhausted. Dry over potassium carbonate and remove the remaining solvent in vacuo.

In similar manner all acid addition salts of Compounds I and II are converted into their corresponding free bases.

EXAMPLE 6

*4-(p-hydroxybenzyl)-5-oxo-1,2-pentamethylene-imidazoline*

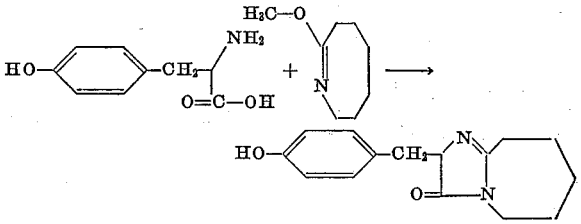

tyrosine

Reflux 29.8 parts of tyrosine and 32.0 parts of caprolactim-methylether in DMF for 2 hours. On cooling to room temperature the title compound precipitates. Recrystallize said title compound from 95% (aq.) ethanol. The yield is 31.5 parts of title compound, melting point (M.P.) 209° to 211°. This compound has sedative activity and can be so employed.

An elemental analysis for $C_{15}H_{18}N_2O_2$ provides the following comparison:

Calculated, percent: C, 69.7; H, 7.0; N, 10.8; O, 12.4.
Found, percent: C, 69.6; H, 7.3; N, 10.8; O, 12.7.

In an analogous manner α-benzyl glycine (in place of tyrosine) produces the corresponding base, 4-benzyl-5-oxo-1,2-pentamethylene-imidazoline, which is useful as a CNS stimulant; and, likewise, 1-amino-trans-4-methylcyclohexanecarboxylic acid (in place of tyrosine) produces the corresponding base, 4-(4'-methyl-spiro-cyclohexyl)-5-oxo-1,2-pentemethylene-imidazoline.

EXAMPLE 7

*2-methyl-1,8-diaza-bicyclo(5,3,0)-decen-Δ⁷,⁸-one-(10)*

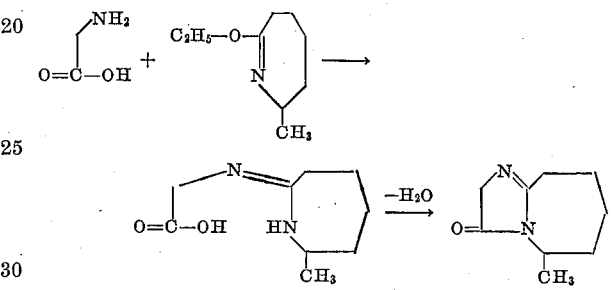

Stir at room temperature overnight 25 parts of 2-methyl-caprolactim-ethylether, M.P. 90° to 92° [prepared from the corresponding lactam (Hildebrand, J. G., et al., "Journal of the American Chemical Society," 58, 651, 1936) with triethyl oxonium borofluoroate] with 11.2 parts of glycine and 100 parts by volume of methanol. Reflux the resulting admixture for fifteen minutes. Evaporate the product in vacuo, and crystallize from methanol/ethyl acetate, M.P. 180° (dec.).

An elemental analysis for $C_9H_{16}N_2O_2$ provides the following comparison:

Calculated, percent: C, 58.7; H, 8.8; N, 15.2; O, 17.4.
Found, percent: C, 58.9; H, 9.1; N, 14.9; O, 17.8.

In an analogous manner corresponding compounds are prepared from each of the α-(primary)amino acids enumerated in Table A. These are amidino acid intermediates for desired final products, which correspond to the instant title compound.

To effect ring closure (dehydration) of the amidino acid intermediate to produce the title compound, dissolve said acid in 200 parts by volume of toluene and 20 parts by volume (containing 0.100 part of paratoluenesulfonic acid) of DMF. Reflux the resulting solution for thirty minutes. The reaction is then complete. The produced base (title compound) distils at 83°/0.08 mm. and solidifies, M.P. 70° to 71.5°. The yield is 14 parts. This compound is a CNS depressant.

Infrared adsorption spectra reveal a peak at 1730 cm.⁻¹ (strong >C=O) and a peak at 1635 cm.⁻¹ (strong >C=N—).

An elemental analysis for $C_9H_{14}N_2O$ provides the following comparison:

Calculated, percent: C, 65.0; H, 8.5; N, 16.9; O, 9.6.
Found, percent: C, 65.1; H, 8.7; N, 16.6; O, 10.0.

The hydrochloride, M.P. 202° (dec.), of said base is obtained by neutralization with an isopropanol solution of hydrogen chloride.

An elemental analysis for $C_9H_{15}ClN_2O$ provides the following comparison:

Calculated, percent: C, 53.3; H, 7.5; N, 13.8; O, 7.9; Cl, 17.5. Found, percent: C, 53.7; H, 7.9; N, 13.3; O, 8.2; Cl, 17.1.

In an analogous manner corresponding free bases (Compounds I and II) and their acid addition salts are prepared from each of the α-(primary)amino acids enumerated in Table A.

EXAMPLE 8

*5-oxo-1,2-tetramethylene-imidazoline*

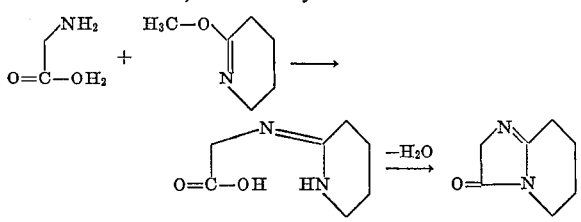

Stir overnight at room temperature 10 parts of valerolactim methylether ["The Journal of Organic Chemistry," vol. 26, p. 68, 1961, Mack Printing Co.] and 6.65 parts of glycine with 30 parts by volume of methanol. A crystalline amidino acid intermediate, M.P. 175° to 177°, which is extremely hydroscopic, is thus formed.

To effect ring closure of the amidino acid intermediate to produce the title compound, dissolve said intermediate in 200 parts by volume of toluene and 20 parts by volume (containing 0.100 part of paratoluenesulfonic acid) of DMF. Reflux the resulting solution for thirty minutes. The reaction thus completed, the base (title compound), boiling point (B.P. 110°/0.5 mm.), crystallizes. Said compound has sedative activity and can be so employed.

In an analogous manner glycine is replaced by each (separately) of the other amino acids enumerated in Table A to produce the corresponding base (Compounds I and II).

EXAMPLE 9

*Hydrochloride of 5-oxo-1,2-tetramethylene-imidazoline*

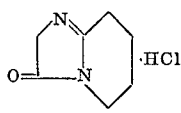

Neutralize the title compound of Example 8 with an isopropanol solution of hydrogen chloride. The hydrochloride (instant title compound) thus obtained has a melting point of 190°.

An elemental analysis for $C_7H_{11}ClN_2O$ provides the following comparison:

Calculated, percent: C, 48.1; H, 6.4; O, 9.2; Cl, 20.3. Found, percent: C, 48.1; H, 6.6; O, 9.8; Cl, 20.9.

EXAMPLE 10

*4,4-dimethyl-5-oxo-1,2-pentamethylene-imidazoline*

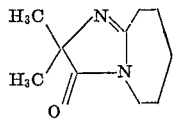

Reflux for two and one half hours a mixture of 10.3 parts of isobutyroamino acid, 12.7 parts of caprolactim-methylether and 20 parts by volume of DMF. Cool the refluxed mixture to room temperature.

Extract with ethyl acetate. Decant the aqueous phase and make same alkaline by the addition thereto of ammonium hydroxide. Extract the free base (title compound) from the alkaline product with chloroform.

Evaporate (in vacuo) the solvent, leaving the free base (15 parts), B.P. 84°/0.05 mm., which is a CNS stimulant.

To obtain the hydrochloride of the title compound, neutralize the free base with an isopropanol solution of hydrogen chloride. The crystalline hydrochloride, M.P. 270° to 271°, precipitates.

An elemental analysis for $C_{10}H_{16}N_2OHCl$ provides the following comparison:

Calculated, percent: C, 55.4; H, 7.9; N, 12.9; O, 7.4; Cl, 16.4. Found, percent: C, 55.2; H, 8.1; N, 12.7; O, 7.5; Cl, 16.2.

In an analogous manner the title compound of Example 1 is employed in place of caprolactim-methylether to obtain the corresponding free base and hydrochloride. Alternatively, valerolactim-methylether is employed with corresponding results.

EXAMPLE 11

*(D,L)-4-phenyl-5-oxo-1,2-pentamethylene-imidazoline*

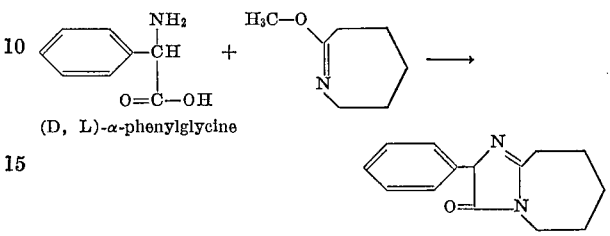

Reflux for two and one half hours a mixture of 10 parts of (D,L)-α-phenylglycine, 50 parts by volume of DMF and 10 parts of caprolactim-methylether. Cool the refluxed mixture to about room temperature. Filter the precipitate from the thus-cooled product, and dissolve the filtered precipitate in 15 percent (aq.) hydrochloric acid.

Extract the resulting solution with ethyl acetate, and decant the aqueous phase. Add ammonium hydroxide to the decanted aqueous phase to render same alkaline.

Extract the free base (title compound) from the alkaline aqueous phase with chloroform. Evaporate the solvent. Recrystallize the residue from DMF. The recrystallized title compound has a melting point of 188° to 188.5°. Said compound has both sedative and diuretic activity and can be so employed.

An elemental analysis for $C_{14}H_{16}N_2O$ provides the following comparison:

Calculated, percent: C, 73.7; H, 7.1; N, 12.3. Found, percent: C, 73.4; H, 7.1; N, 12.6.

An elemental analysis of the corresponding hydrochloride (M.P. 207° to 211°), $C_{14}H_{17}ClN_2O$, crystallized from water, provides the following comparison:

Calculated, percent: C, 63.5; H, 6.5; N, 10.6; O, 6.0. Found, percent: C, 63.7; H, 6.8; N, 10.4; O, 6.3.

EXAMPLE 12

*(D,L)-4-(m,p-dihydroxybenzyl)-5-oxo-1,2-pentamethylene-imidazoline*

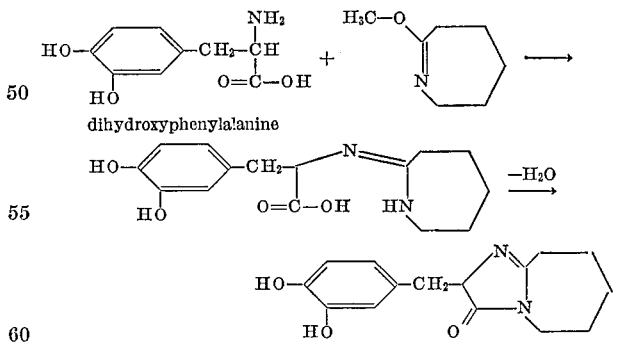

Stir for four hours at 100° an admixture of 18.3 parts of (D,L)-m,p-dihydroxyphenylalanine, 50 parts by volume of DMF and 15.2 parts of caprolactim-methylether. Cool the resultant to room temperature, whereupon a reaction product (intermediate) crystallizes. Recrystallize the intermediate, M.P. 166° to 167°, from methanol/diethylether. A yield of eighteen parts is thus obtained.

Suspend 15 parts of said intermediate (Compound V) in 300 parts by volume of toluene (containing 1.0 part of paratoluenesulfonic acid). Reflux the resulting suspension for two hours. Cool the refluxed material to room temperature, thus crystallizing the title compound. Recrystallize said title compound, M.P. 182° to 186°, from methanol/diethylether. A yield of 9 parts is thus obtained. The title compound has sedative activity and can be so employed.

An elemental analysis for $C_{15}H_{18}N_2O_3$ provides the following comparison:

Calculated, percent: C, 65.7; H, 6.6; N, 10.2. Found, percent: C, 65.3; H, 6.8; N, 10.3.

EXAMPLE 13

(D,L)-4-methyl-5-oxo-1,2-pentamethylene imidazoline

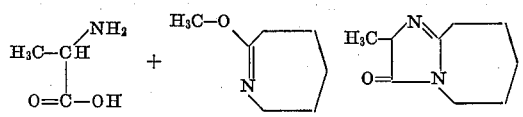

Stir for four hours at 40° a mixture of 17.8 parts of D,L-α-alanine and 26.0 parts of caprolactim-methylether in 300 parts by volume of methanol. A clear solution is thus obtained. Evaporate the solution in vacuo to dryness.

Admix the dried residue with 300 parts by volume of toluene (containing 1.0 part of paratoluenesulfonic acid), and boil the resultant until no more water is split off. Distill off the toluene in vacuo. A yield of 30.6 parts of oily residue (title compound), B.P. 89° to 105°/0.1 mm., is thus obtained. Said compound has sedative activity and can be so employed.

To obtain the corresponding hydrochloride, dissolve the title compound in isopropanol, and neutralize the obtained solution with hydrogen chloride. Add diethylether to the neutralized solution to precipitate said hydrochloride, M.P. 207° to 209°. A yield of 30.0 parts is thus obtained.

An elemental analysis for $C_9H_{14}N_2O \cdot HCl$ provides the following comparison:

Calculated, percent: C, 53.3; H, 7.5; N, 13.8; O, 7.9; Cl, 17.5. Found, percent: C, 53.8; H, 7.7; N, 13.3; O, 8.2; Cl, 17.4.

It is thought that the invention and its advantages will be understood from the foregoing description. It is apparent that various changes may be made in the intermediates and final products without departing from the spirit and scope of the invention or sacrificing its material advantages, the processes, intermediates, free bases and acid addition salts set forth hereinbefore being merely illustrative embodiments.

What is claimed is:

1. A pharmaceutically acceptable compound selected from the group consisting of a free base of the formula

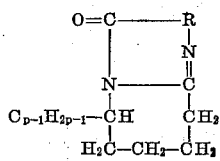

wherein R is a member selected from the group consisting of

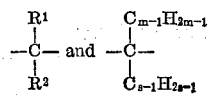

$R^1$ is, taken by itself, a member selected from the group consisting of hydroxy(lower)alkyl, (lower)alkyl-thio-(lower)alkyl, aminocarbonylamino(lower)alkyl, phenyl(lower)alkyl, indolyl(lower)alkyl, phenyl, guanido-(lower)alkyl, guanidoxy(lower)alkyl and ring-substituted benzyl having at least one substituent selected from the group consisting of hydroxy, bromo and iodo;

$R^2$ is, taken by itself, a member selected from the group consisting of a hydrogen atom and lower alkyl;

$R^1$ and $R^2$, taken together, alternatively form a hydrocarbon chain of from two to eight carbon atoms, said chain being a member selected from the group consisting of a saturated chain and an ethylenically unsaturated chain; and each of m, p and s is an integer from 1 to 6, inclusive, the sum of m, p and s being at least 4 when R is

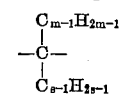

and an acid addition salt thereof.

2. A compound of the formula

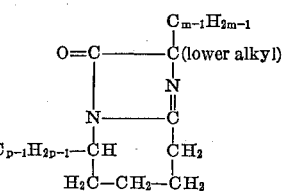

wherein each of m and p is a positive whole number of at most 6.

3. A compound of the formula

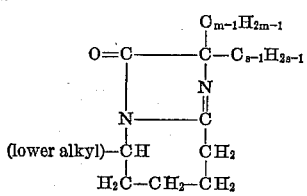

wherein each of m and s is a positive whole number of at most 6.

4. A compound of the formula

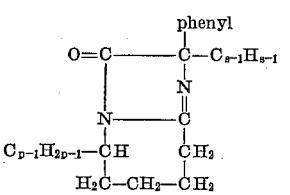

wherein each of s and p is a positive whole number of at most 6.

5. A compound of the formula

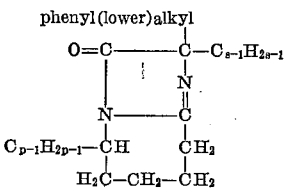

wherein each of s and p is a positive whole number of at most 6.

6. A compound of the formula

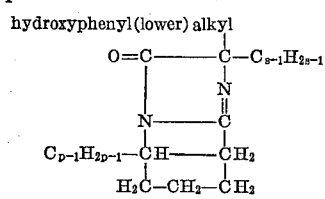

wherein each of s and p is a positive whole number of at most 6.

7. The compound of the formula

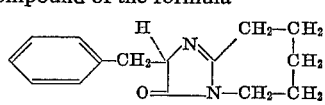

8. The compound of the formula

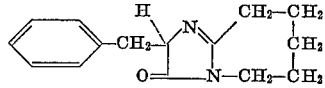

9. The compound of the formula

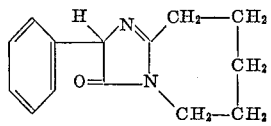

10. The compound of the formula

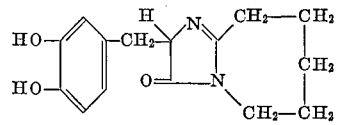

11. The compound of the formula

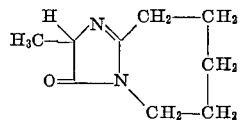

12. The compound of the formula

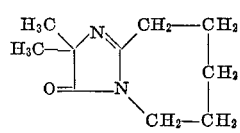

13. The compound of the formula

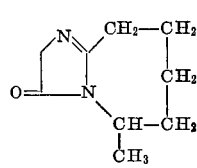

14. A pharmaceutically acceptable compound selected from the group consisting of a free base of the formula

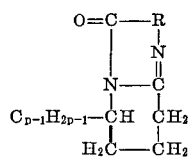

wherein R is a member selected from the group consisting of

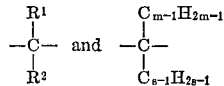

$R^1$ is, taken by itself, a member selected from the group consisting of hydroxy(lower)alkyl, (lower)alkyl-thio-(lower)alkyl, aminocarbonylamino(lower)alkyl, phenyl(lower)alkyl, indolyl(lower)alkyl, phenyl, guanido (lower)alkyl, guanidoxy(lower)alkyl and ring-substituted benzyl having at least one substituent selected from the group consisting of hydroxy, bromo and iodo;

$R^2$ is, taken by itself, a member selected from the group consisting of a hydrogen atom and lower alkyl;

$R^1$ and $R^2$, taken together, alternatively form a hydrocarbon chain of from two to eight carbon atoms, said chain being a member selected from the group consisting of a saturated chain and an ethylenically unsaturated chain; and each of $m$, $p$ and $s$ is an integer from 1 to 6, inclusive, the sum of $m$, $p$ and $s$ being at least 4 when R is

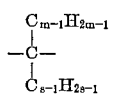

and an acid addition salt thereof.

15. A compound of the formula

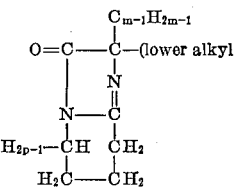

wherein each of $m$ and $p$ is a positive whole number of at most 6.

16. A compound of the formula

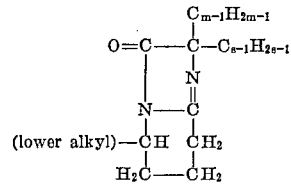

wherein each of $m$ and $s$ is a positive whole number of at most 6.

17. A compound of the formula

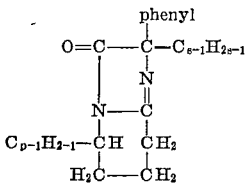

wherein each of $s$ and $p$ is a positive whole number of at most 6.

18. A compound of the formula

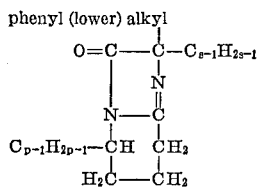

wherein each of $s$ and $p$ is a positive whole number of at most 6.

19. A compound of the formula

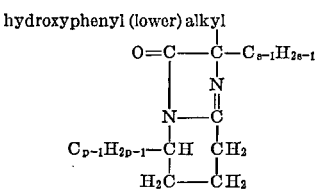

wherein each of $s$ and $p$ is a positive whole number of at most 6.

20. A compound of the formula

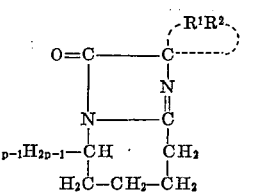

wherein

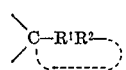

is an unsubstituted carbocyclic ring of at most nine carbon atoms and selected from the group consisting of a saturated ring and an ethylenically unsaturated ring and $p$ is a positive whole number of at most 6.

21. A compound of the formula

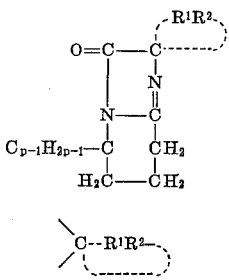

wherein $$\begin{array}{c}\diagdown\\C\text{-}\text{-}R^1R^2\text{-}\text{-}\\\diagup\end{array}$$

is an unsubstituted carbocyclic ring of at most nine carbon atoms and selected from the group consisting of a saturated ring and an ethylenically unsaturated ring, and $p$ is a positive whole number of at most 6.

References Cited

UNITED STATES PATENTS 3,002,000  9/1961  Tietze _____ 260—309.6

FOREIGN PATENTS 1,082,268  5/1960  Germany.

WALTER A. MODANCE, *Primary Examiner.*

A. D. SPEVACK, *Assistant Examiner.*